Figure 1:
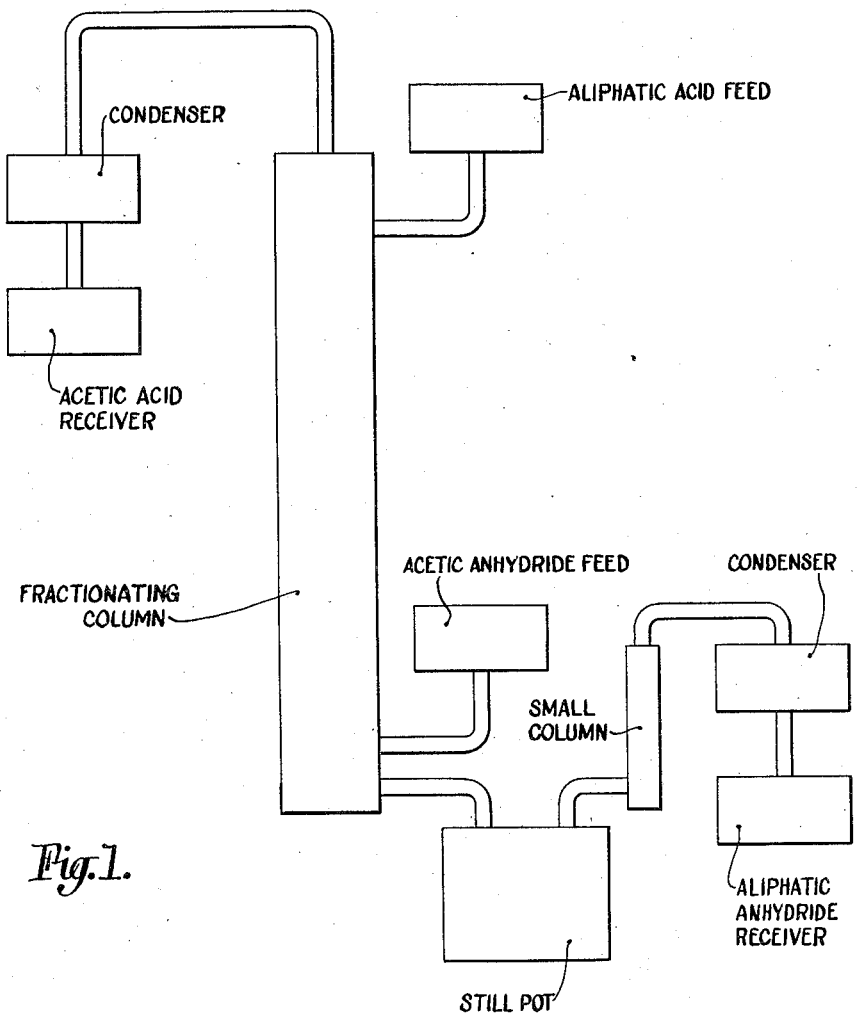

Jan. 7, 1936.  C. J. MALM ET AL  2,026,985
PROCESS FOR THE MANUFACTURE OF ALIPHATIC ACID ANHYDRIDES
Filed March 27, 1933   2 Sheets-Sheet 1

Jan. 7, 1936.                C. J. MALM ET AL                2,026,985
        PROCESS FOR THE MANUFACTURE OF ALIPHATIC ACID ANHYDRIDES
                        Filed March 27, 1933        2 Sheets-Sheet 2
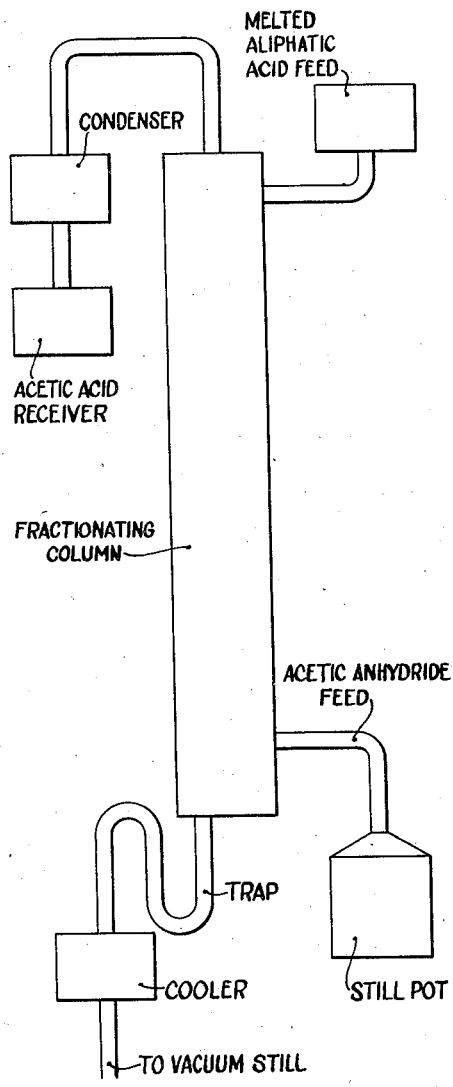
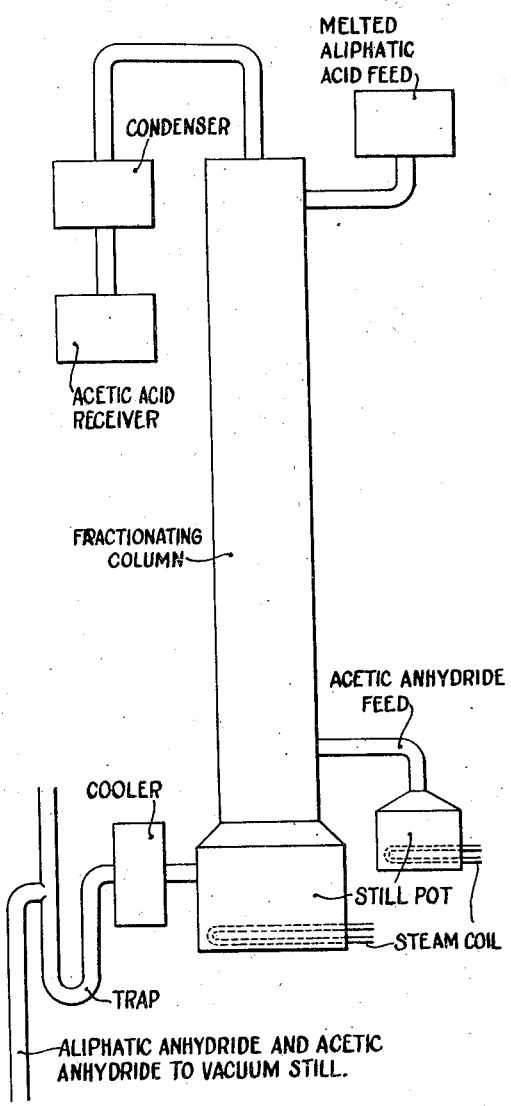

Patented Jan. 7, 1936

2,026,985

UNITED STATES PATENT OFFICE 2,026,985

PROCESS FOR THE MANUFACTURE OF ALIPHATIC ACID ANHYDRIDES

Carl J. Malm and Webster E. Fisher, Rochester, N. Y., assignors to Eastman Kodak Company, Rochester, N. Y., a corporation of New York Application March 27, 1933, Serial No. 662,908

4 Claims. (Cl. 260—123)

This invention relates to the manufacture of the anhydrides of fatty acids and substituted fatty acids. One object of our invention is to provide a rapid, continuous method for preparing aliphatic acid anhydrides. Another object is to provide a process which will give high yields of such anhydrides. Other objects will hereinafter appear.

It is known that the anhydrides of higher fatty acids can be prepared by distilling the higher fatty acid with acetic anhydride. In Clarke and Malm's U. S. Patent 1,648,540 it is shown that this process is applicable to the manufacture of the anhydrides of halogenated fatty acids. In the application of Malm and Fordyce, Serial No. 588,494, filed January 23, 1932, it is shown that the anhydrides of alkoxy fatty acids can be similarly prepared. The anhydrides are subsequently purified by distillation under vacuum if necessary. In the remainder of this specification, and in the claims, we shall include the fatty acids higher than acetic acid, and the substituted fatty acids, such as the halogenated fatty acids and the alkoxy fatty acids, in the term aliphatic acids.

We have discovered that important advantages are attained if the distillation of aliphatic acids with acetic anhydride to form aliphatic acid anhydrides is carried out on the counter-current principle. Among these advantages are the following. 1. The process is continuous. 2. The time required for preparing a given amount of anhydride is materially shortened. 3. Side reactions and decomposition of the product are much reduced, because of the shortening of the time in which the materials are exposed to a high temperature. 4. The yield is greatly increased. When the old batch method is used, many anhydrides cannot be prepared in large quantities, because during the time required for a large quantity of acid to react, the high temperature brings about extensive decomposition.

Our novel counter-current process for producing aliphatic acid anhydrides may be carried out in a fractionating column, the aliphatic acid entering the column near the top and running down the column, meeting an ascending stream of acetic anhydride vapor. The acetic anhydride is introduced near the bottom of the column, either as a vapor or as a liquid. In the latter case, it must be vaporized in the column. The fractionating column should preferably be of a type which provides a large surface for the aliphatic acid to flow over, such, for instance, as a packed column or a plate column.

As the aliphatic acid flows down through the column, it gradually becomes converted to the anhydride, while the acetic anhydride vapor rising through the column is converted to acetic acid, which is continuously distilled from the top of the column. The aliphatic acid anhydride formed by the reaction works its way down the column to a small still pot, from which it may be removed by distilling through a short column. If this still pot is connected directly to the fractionating column, the heat communicated from the still pot to the lower part of the column is sufficient to vaporize the acetic anhydride when the latter is introduced into the column as a liquid. If the nature of the aliphatic acid used or of its anhydride is such that decomposition takes place when it is distilled at atmospheric pressure, the whole system can conveniently be operated under reduced pressure.

When the acid whose anhydride is to be produced is a liquid at room temperature, the operation may conveniently be carried out in an apparatus such as that shown in the attached Fig. 1, which forms a part of this specification. Figs. 2 and 3, attached hereto and forming a part of this specification, show forms of apparatus which may be used when the acid whose anhydride is to be produced is a solid at room temperature. Of these the form of apparatus shown in Fig. 3 has been found to be preferable.

As an example of the method of carrying out our process when the aliphatic acid whose anhydride is to be formed is a liquid at room temperature, we shall describe the preparation of butyric anhydride by our novel counter-current process. In this case an apparatus such as that shown in Fig. 1 was used. The fractionating column used was a plate column of glass, containing 14 plates. Butyric acid was introduced into the column at a point between the third and fourth plates from the top from the vessel marked Aliphatic acid feed. Liquid acetic anhydride was introduced by gravity feed above the first plate from the bottom, from the vessel marked Acetic anhydride feed. The ratio of butyric acid to acetic anhydrides should be at most 2 mols of butyric acid to one mol. of acetic anhydride, it being desirable to use a slight excess of acetic anhydride. In the present example a slight excess of acetic anhydride was used. Acetic acid, together with a small amount of acetic anhydride, distilled continuously from the top of the column, was condensed in the condenser and collected in the vessel marked Acetic acid receiver. Butyric anhydride was refluxed down the fractionating column to the still pot below and to one side of the column. From the still pot the butyric anhydride was continuously distilled through the small column shown, condensed in the condenser connected thereto, and collected in the vessel marked Aliphatic anhydride receiver. The heat applied to the still pot to distill the butyric anhydride heated the large fractionating column sufficiently to vaporize the acetic anhydride introduced near the bottom of the fractionating column and cause it to ascend through the column.

During the continuous operation, the temperatures were maintained as follows. Top of still: 125° C., showing an excess of acetic anhydride. Above 6th plate from top: 147° C. Above 2nd plate from bottom: 186° C. Still pot: 196° C., showing nearly pure butyric anhydride. Butyric anhydride boils at about 191–194° C., and this boiling point is raised a degree or so by the pressure in the still pot. Top of small column: 194° C., showing butyric anhydride.

As an example of the method of carrying out our novel counter-current process when the aliphatic acid whose anhydride is to be formed is a solid at room temperature, we shall describe the preparation of stearic anhydride by our process. In this case an apparatus such as that shown in Fig. 2 may be used; however, we have found it preferable to employ a form of apparatus such as that shown in Fig. 3. Melted stearic acid is introduced a short distance below the top of the column, from the vessel marked Melted aliphatic acid feed. Acetic anhydride is introduced in vapor form near the bottom of the column, from a still pot heated by a steam coil or other suitable heating arrangement. The acetic anhydride may with advantage be superheated. It is desirable to use a slight excess of acetic anhydride. Acetic acid is continuously distilled from the top of the column, condensed in the condenser, and collected in the acetic acid receiver, while stearic anhydride, together with some acetic anhydride, works its way to the bottom of the column. Here it may be removed as shown in Fig. 2, through a trap and, if necessary, a cooler, to a vacuum still, where the acetic anhydride is removed under high vacuum. However, we have found it preferable to connect a heated still pot at the bottom of the fractionating column, to vaporize the acetic anhydride which reaches the bottom of the column with the stearic anhydride. The stearic anhydride can thus be discharged containing less acetic anhydride than otherwise.

In order to avoid decomposition of the stearic anhydride by heating, the still pot should be of as small a capacity as possible, so that the stearic anhydride need not stay there any longer than necessary. From the still pot, the stearic anhydride goes, through a cooler and a trap, to a vacuum still for purification.

The acetic anhydride can be fed into the fractionating column as a liquid, but improved operation is secured if it is fed in the form of a vapor, since less heat must be supplied to the still pot at the bottom of the column, thus reducing the possibility of decomposition.

The preparation of stearic anhydride well illustrates the advantage to be gained from the use of our novel counter-current method of preparation. In a batch system, no matter how small the scale used, the stearic acid and stearic anhydride must be subjected to high temperature for several hours at least, before the reaction is completed. Decomposition is inevitable. In our process, the stearic acid is subjected to a temperature of not more than 140° C., and that only for the short time it takes for it to work its way down the column. The amount of decomposition is negligible.

In the preparation of some aliphatic anhydrides by our process, a catalyst may be desirable, or even necessary. For instance, in the preparation of chloroacetic anhydride by our process, magnesium perchlorate dissolved in the chloroacetic acid fed in acts as a catalyst to accelerate the reaction.

It will be understood that the above examples are given only by way of illustration of the method of carrying out our novel process, and that we are not to be limited by them except as indicated in the appended claims.

What we claim as our invention and desire to be secured by Letters Patent of the United States is:

1. A process of preparing the anhydride of an aliphatic acid from the corresponding acid and acetic anhydride comprising passing the aliphatic acid and acetic anhydride vapor, in contact with magnesium perchlorate, in counter-current through a fractionating column.

2. A process of preparing the anhydride of a fatty acid higher than acetic acid from the corresponding acid and acetic anhydride, comprising passing the fatty acid and acetic anhydride vapor in contact with magnesium perchlorate, in counter-current through a fractionating column.

3. A process of preparing the anhydride of a halogenated fatty acid from the corresponding acid and acetic anhydride, comprising passing the halogenated fatty acid and acetic anhydride vapor, in contact with magnesium perchlorate, in counter-current through a fractionating column.

4. A process of preparing the anhydride of an alkoxy fatty acid from the corresponding acid and acetic anhydride, comprising passing the alkoxy fatty acid and acetic anhydride vapor, in contact with magnesium perchlorate, in counter-current through a fractionating column.

CARL J. MALM.
WEBSTER E. FISHER.